(Model.)
J. A. TRAUT.
GAGE FOR PLANE BITS.
No. 293,822. Patented Feb. 19, 1884.
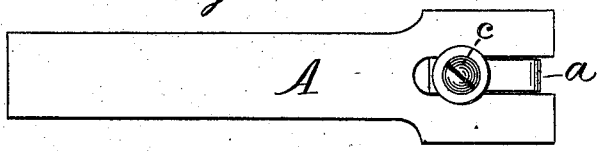
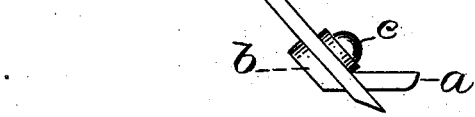
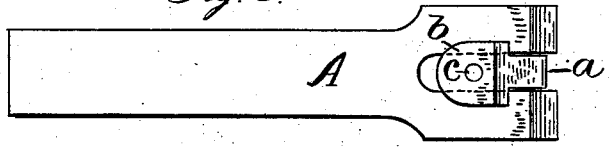
Witnesses:
John Edwards Jr.
Eddy N. Smith
Inventor:
Justus A. Traut.
By James Shepard
Atty.

UNITED STATES PATENT OFFICE.

JUSTUS A. TRAUT, OF NEW BRITAIN, CONNECTICUT.

GAGE FOR PLANE-BITS.

SPECIFICATION forming part of Letters Patent No. 293,822, dated February 19, 1884.

Application filed October 17, 1883. (Model.)

*To all whom it may concern:*

Be it known that I, JUSTUS A. TRAUT, a citizen of the United States, residing at New Britain, in the county of Hartford and State of Connecticut, have invented certain new and useful Improvements in Stops for the Cutters of Matching-Planes, of which the following is a specification.

My invention relates to improvements in stops for the cutters of matching-planes; and the object of my invention is to furnish a convenient and inexpensive means for limiting the aggregate depth of cut. I attain this object by the simple construction illustrated in the accompanying drawings, in which—

Figure 1 is a plan view of my improved stop and the cutter to which it is attached. Fig. 2 is a side or edge view of the same, and Fig. 3 is a reverse plan view thereof.

I make the cutter A of substantially the usual form, except that I make its shank narrower than the end of the cutting-bit, in order to adapt the cutter for use in a two-part stock, in the manner fully described in an accompanying application of even date herewith.

Within the slot in the middle of the cutter I arrange a depth-stop, $a$, the same being narrow enough to pass through said slot. This stop $a$ is in the form of an angle-piece, with its back or shank, $b$, of a width greater than the slot in the end of the cutter. The angle at which the bottom of the stop and its shank stand to each other is such that when the shank rests upon the back of the cutter and the cutter is set at the angle of inclination that it will bear when properly seated within the stock, the body of the stock $a$ will be substantially in a horizontal position, as shown in Fig. 2. I hold the stop in place by means of an adjusting-screw, $c$, which passes through the slot in the cutter into a threaded hole in the shank $b$ of the stop. This screw may have a head large enough to cover the slot in the cutter; but I prefer to place a washer under the head of the screw, as shown. By loosening the screw the stop $a$ may be slipped up and down in the slot of the cutter, so as to bring its under surface at any desired distance from the cutting-edge of said cutter, the slot therein being made long enough to permit of said adjustment. When so adjusted, the screw may be tightened to hold the stop in place. As the cutting-edge upon either side of the slot is brought into action to form a tongue, the tongue extends up into the slot in the cutter. After repeated cuts, the stop $a$ bears upon the edge of the tongue, to limit the depth of the cut, and consequently the extent that the tongue shall project from the shoulders formed on the edge of a board by means of said cutter. It will thus be seen that by the term "depth-stop" I mean a stop for limiting the extent which the plane is capable of cutting by repeated strokes, in contradistinction to the depth of a single cut, (the thickness of the shaving,) which is governed by the extent that the edge of the cutter projects from the bottom of the stock and by the width of the throat in said stock. By thus arranging the stop within the slot of the cutter and providing it with suitable means for permitting of its adjustment and holding it upon the cutter, I provide a depth-stop which is not only convenient to adjust and use, but it may always remain upon the cutter, so that it will not become lost, and so that a change in the adjustment is not necessitated every time the cutter is removed from the stock.

I am aware that matching-planes have heretofore been made in which an adjustable depth-stop has been secured to the stock, and I hereby disclaim the same.

I claim as my invention—

A stop to regulate the aggregate depth of cut, attached directly to the cutter of a matching-plane, with the body of the stop within the slot of the cutter, substantially as described, and for the purpose specified.

JUSTUS A. TRAUT.

Witnesses:
JAMES SHEPARD,
JOHN EDWARDS, Jr.